United States Patent [19]

Marzocchi et al.

[11] 4,338,231

[45] Jul. 6, 1982

[54] MODIFIED ASPHALT COMPOSITIONS

[75] Inventors: Alfred Marzocchi, Newark; Charles E. Bolen, Heath; Edward R. Harrington, Newark; Michael G. Roberts, Heath, all of Ohio

[73] Assignee: Owens-Corning Fiberglas Corporation, Toledo, Ohio

[21] Appl. No.: 200,724

[22] Filed: Oct. 27, 1980

Related U.S. Application Data

[63] Continuation-in-part of Ser. No. 158,966, Jun. 12, 1980.

[51] Int. Cl.³ .............................................. C08L 95/00
[52] U.S. Cl. .................................. 523/214; 428/378; 428/429; 428/430; 428/431; 527/500; 525/10; 525/33; 525/34; 523/527
[58] Field of Search .................... 260/28.5 AS, 28 R; 525/35; 428/378, 430

[56] References Cited

U.S. PATENT DOCUMENTS

| | | | |
|---|---|---|---|
| 2,701,777 | 2/1955 | Farris | 117/126 |
| 2,877,129 | 3/1959 | Hardman | 106/279 |
| 3,349,051 | 10/1976 | Alexander et al. | 260/28.5 |
| 3,483,153 | 12/1969 | Pitchford | 260/28.5 |
| 3,864,203 | 2/1975 | Marzocchi | 161/175 |

OTHER PUBLICATIONS

L. Ciplijauskas, Ind. Eng. Chem. Prod. Res. Dev., vol. 18, No. 2, 86-88, Jun., 1979.

*Primary Examiner*—Theodore E. Pertilla
*Attorney, Agent, or Firm*—Ronald C. Hudgens; Robert F. Rywalski; Keith V. Rockey

[57] ABSTRACT

An asphalt-modified polyester composition comprising an asphalt which has first been reacted with a polycarboxylic acid or anhydride and a polyalcohol; the modified asphalt is then reacted with a polyester and a vinyl aromatic monomer to produce a molding composition which is ideally suited for combination with a glass fiber reinforcement in the molding of rigid bodies reinforced with, for example, glass fibers.

15 Claims, No Drawings

MODIFIED ASPHALT COMPOSITIONS

This is a continuation-in-part of copending application Ser. No. 158,966, filed June 12, 1980.

This invention relates to chemically-modified asphalt compositions, and more specifically to asphalt compositions which have been chemically-modified with a polyester resin to impart increased rigidity and reduced tack to the asphalt and to promote compatibility between the asphalt and reinforcements therefor.

As is well known to those skilled in the art, asphalt is a bituminous material which contains bitumens occurring in nature or bitumens obtained as the residue in the refining of petroleum. Generally, asphalt is made up of condensed hydrocarbon rings which contain various reactive groups, and notably carbon-to-carbon double bonds as well as hydroxy groups, carboxy groups and like functional groups. In terms of distribution, asphalt is much like a plastisol in that it is formed of graphitic particles suspended in a viscous liquid. The particles are of the same chemical type, but differ each from the other primarily in molecular weight. Thus, the liquid phase of the asphalt is formed predominantly of lower molecular weight condensed hydrocarbon rings, whereas the graphitic particles suspended therein are made up of high molecular weight condensed hydrocarbon rings.

One of the advantages of asphalt stems from the fact that it is a tough material which is, for the most part, highly inert chemically. Thus asphalt has numerous desirable characteristics from the standpoint of use in the manufacture of moldable structural members, but for one significant drawback. That is, that asphalt tends to be tacky, and hence unsuitable for use in the manufacture of such structural members.

It is known, as is described in U.S. Pat. No. 4,008,095, that asphalt can be modified by blending with various materials including coal or synthetic elastomers and petroleum resins. One of the difficulties with the techniques of the sort described in that patent arises from the fact that the resulting blend of asphalt with an elastomeric or resinous modifying agent is not homogenous, with the result that there is a tendency for the modifying agent to separate from the asphalt. Without limitation as to theory, it is believed that the reason for such separation arises from the fact that resinous modifying agents are not chemically bonded to the asphalt. As a result, it is difficult to obtain a homogeneous system by simply blending a modifying agent with the asphalt. That difficulty is compounded when it is desired to reinforce asphalt systems with fillers such as glass fibers and/or glass flake; such reinforcing fillers seem to promote separation of the various components with the asphalt system.

In copending application Ser. No. 158,966, which is hereby incorporated by reference, there is described a chemically-modified asphalt composition wherein asphalt is reacted with a polyester resin formed in situ, and preferably formed by reacting the asphalt first with a polycarboxylic acid or anhydride, and then reacting the product of that reaction with a polyester-forming polyalcohol. As described in that copending application, it was found that the amount of the polyester which could be incorporated with the asphalt was increased when the polyester was formed in situ. The resulting chemically-modified asphalt, as described in the foregoing copending application, can then be crosslinked through the use of suitable crosslinking agents. While the composition as described in that copending application represents a distinct advantage over the prior art in the incorporation of a polyester resin with an asphalt, there is still room for further improvement where the asphalt is to be used in molding compositions, particularly to produce molded products which are reinforced with reinforcing fillers such as glass fibers.

It is also known, as described in U.S. Pat. No. 3,349,051, that a polyester-modified bitumen such as asphalt can be prepared by mixing the bitumen, an unsaturated polyester resin, and a substituted aromatic hydrocarbon containing ethylenic unsaturation whereby the solvent serves to crosslink the polyester resin. As described in that patent, curing of the polyester resin can be accelerated by the use of a free radical initiator, and notably a peroxide free radical initiator. It has been found, however, that the asphalt contains certain groups, and perhaps unsaturated groups, which inhibit the free radical crosslinking reaction of the solvent with the polyester, and thereby prevent chemical incorporation or bonding of the polyester resin to the asphalt to any significant degree.

It is accordingly an objective of this invention to provide a polyester-modified asphalt system which overcomes the disadvantages described above.

It is a more specific objective of the invention to provide a polyester-asphalt composition wherein the asphalt molecules are chemically combined with a polyester resin formed in situ to thereby improve the reactivity of the resulting modified asphalt whereby the chemically-modified asphalt can be crosslinked with conventional polyester molding compositions which can be reinforced with reinforcing fillers, including glass fibers and/or glass flake.

The concepts of this invention reside in a polyester-modified asphalt composition wherein the asphalt is first reacted with a polyester resin formed in situ, preferably by reacting the asphalt first with a polycarboxylic acid or anhydride followed by a reaction of the product with a polyester-forming polyalcohol. Thus, the chemically-modified asphalt is reacted with a polyester resin and a vinyl monomer which acts as a crosslinking agent for the polyester. Without limiting the invention as to theory, it is believed that the polycarboxylic acid or anhydride is reactive with functional groups in the asphalt itself and thereby serves to couple, by means of chemical bonds, the polyester resin ultimately formed to the asphalt. The resulting chemically-modified asphalt can thus be crosslinked with the added polyester through the use of the crosslinking agent. It has been found that the reaction of the acid or anhydride with the asphalt prevents or substantially minimizes the inhibitory effect of the asphalt on the subsequent crosslinking reaction.

The polyester resin formed in situ and chemically bonded to the asphalt system serves as a source of reaction sites to establish a secure chemical bond between the chemically-modified asphalt and the polyester resin added to the modified asphalt. The resulting asphalt can be reinforced with reinforcing fillers such as glass, asbestos or organic fibers (in the form of strands, mats, woven and non-woven fabrics, etc.), siliceous aggregate, glass flake or combinations thereof blended with the polyester-asphalt composition in reinforced asphalt systems. In addition, the crosslinking of the polyester-asphalt virtually eliminates the tacky characteristics common to most asphalts and facilitates the use of the resulting chemically-modified asphalt as a moldable material for use in the manufacture of structural members.

In the practice of the invention, use is made of an asphalt in the form of ordinary asphalt or an asphalt which has been modified by reaction in the presence of air (e.g., blown asphalt), steam, ammonia or organic amines as described in application Ser. No. 852,772, filed Nov. 18, 1977.

As to the polycarboxylic acid or anhydride used to form the polyester in situ, use is made of an organic acid or anhydride containing 2 to 25 carbon atoms and 2 to 4 carboxyl groups, when the material is in the acid form. Preferred are acids having the general formula:

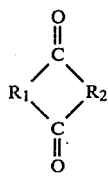

wherein $R_1$ is a divalent organic group containing 1 to 25 carbon atoms, including an alkenylene or an arylene group and $R_2$ is 0 or a pair of OH groups, each of which is bonded to the carbonyl groups when the compound is in an acid form. Examples of suitable carboxylic acids and anhydrides include oxalic acid, malonic acid, succinic acid, glutaric acid, maleic anhydride, glutaconic acid, adipic acid, suberic acid, 1,2,3-propene tricarboxylic acid, phthalic acid, terephthalic acid, terephthalic anhydride, 1,3,5-benzene tricarboxylic acid, napthalic acid, 3,5-peridene dicarboxylic acid, 3,4-quinoline dicarboxylic acid, etc. Maleic anhydride is preferred.

As to the polyalcohol, use is made of an organic, polyester-forming polyalcohol containing 2 to 20 carbon atoms and 2 to 4 hydroxyl groups. In general, such polyalcohols have the general formula:

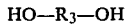
$$HO-R_3-OH$$

where $R_3$ is a divalent group containing 2 to 20 carbon atoms. $R_3$ thus can be an alkylene groups, or an alkenylene group. In addition, $R_3$ can be an alkyleneoxyalkylene group such as those derived from glycols. Preferred polyalcohols include ethylene glycol, diethylene glycol, triethylene glycol, glycerol and a variety of other polyalcohols conventionally used in the preparation of polyesters.

Relative proportions of the acid of anhydride and polyalcohol relative to the asphalt are not critical, and can be varied within the generally cited ranges. Best results are usually achieved when the weight of the acid or anhydride is within the range of 5 to 200 percent by weight based on the weight of the asphalt, and the alcohol is correspondingly used in an amount such that the total molar ratio of alcohol is within the range of 0.5 to 1.5 based upon the moles of acid employed. In general, the proportions of the acid or anhydride and polyalcohol is such that the polyester thus formed in situ is present in an amount sufficient to impart rigidity and non-tackiness to the resulting chemically-modified asphalt composition.

In the preferred practice of the invention, it has been found that no catalyst is necessary to form the desired reaction product, it being sufficient that the asphalt be heated in the presence of the acid or anhydride followed by the addition of the polyalcohol. Reaction temperatures within the range of 100° to 400° F. are generally employed, with higher reaction temperatures favoring more rapid reaction rates. If desired, the asphalt can be, prior to reaction, dissolved in an inert organic solvent such as an aromatic solvent, although the solvent is unnecessary. It is possible to carry out the reaction under non-oxidizing conditions; vacuum or inert gas in the reaction vessel can be used for that purpose.

After the asphalt has been chemically-modified by reaction with a carboxylic acid or anhydride and ester-forming polyalcohol, the resulting chemically-modified asphalt is then blended with the polyester resin and crosslinking agent for the polyester resin. As the polyester resin, use can be made of any of a wide variety of commercial polyester resins conventionally used in molding applications. Preferred are polyester resins containing ethylenic unsaturation, such as those produced by reaction of maleic anhydride with a polyester-forming polyalcohol. As will be appreciated by those skilled in the art, the polyester resin blended with the chemically-modified asphalt described above can be the same or different from the polyester resin which is formed in situ by reaction with the asphalt.

Thus, the polyester resin is preferably one formed by reaction of a polycarboxylic acid or anhydride of the type referred to above with the polyester-forming polyalcohol of the type referred to above. Again, it is preferred that the polyester blended with the chemically-modified asphalt be a polyester derived from maleic anhydride, thus containing ethylenic unsaturation.

As the crosslinking agent, use can be made of a variety of crosslinking agents conventionally used in the manufacture of polyester molding composition. Preferred crosslinking agents are vinyl monomers which serve as a solvent for the polyester to be blended with the chemically-modified asphalt. Most preferred in the practice of the present invention are crosslinking agents in the form of a vinyl aromatic monomer, such as those having the general formula:

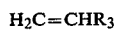
$$H_2C=CHR_3$$

wherein $R_3$ is an aromatic group containing 6–12 carbon atoms, including phenyl and substituted phenyl as well as naphthyl and heterocyclic aromatic rings such as quinolyl, etc. The preferred crosslinking agent is styrene, although a wide variety of other conventional polyester-crosslinking agents may be used, such as vinyl toluene, divinylbenzene, vinyl naphthalene, vinyl quinolene, vinyl piridine, etc.

As will be appreciated by those skilled in the art, polymerizable vinyl compounds of the formula

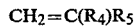
$$CH_2=C(R_4)R_5$$

are suitable, wherein $R_4$ is H or a lower ($C_1$–$C_5$) alkyl and $R_5$ is an aliphatic or a cycloaliphatic group containing up to 10 carbon atoms. Representative of such suitable crosslinking agents are acids and esters, as well as a number of aliphatic and cycloaliphatic agents well known to those skilled in the art for use in crosslinking polyesters. Specifically exemplary of such suitable compounds are vinyl acetate, acrylic acids and esters like methacrylic acid and the methyl and ethyl esters of acrylic and methacrylic acid.

The crosslinking of the polyester resin blended with the chemically-modified asphalt serves, as will be appreciated by those skilled in the art, to render the resulting composition rigid and non-tacky. In the preferred practice of the invention, where an unsaturated carboxylic acid or anhydride is reacted with the asphalt in the formation of a polyester resin in situ and an unsaturated polyester resin is employed for blending with the chemically-modified asphalt, the crosslinking agent serves to chemically bond the polyester resin added to the reaction mixture to the polyester resin formed in situ to thereby further chemically integrate the polyester resins together and thereby chemically integrate the polyester resin to the asphalt matrix. That is possible by reason of the fact that the prereaction of the asphalt with a carboxylic acid or anhydride serves to minimize the inhibitory effect which would otherwise be presented by some of the components of the asphalt. The resulting composition is thus rendered non-tacky and homogeneous on curing with a crosslinking agent.

As is the case with conventional polyester resin molding compositions, curing of the polyester resin components can be accelerated through the use of a free radical initiator, and preferably an initiator of the peroxide type. Representative of suitable initiators include benzoyl peroxide, tertiary butyl peroxide, etc.

In the final molding composition, the relative proportions of the components are not critical and can be varied within relatively wide ranges. In general, the chemically-modified asphalt, that is the asphalt which has been prereacted to form a polyester resin in situ, is present in an amount within the range of 10–60% by weight based on the total weight of the composition, while the polyester resin blended therewith is present in an amount ranging from 10–60% by weight based on the total weight of the composition. The crosslinking agent should be employed in an amount sufficient to chemically integrate the polyester resin with the chemically-modified asphalt, and usually an amount within the range of 0.001 to 30% by weight based on the total weight of the composition is suitable for that purpose. Similarly, the initiator employed is an amount sufficient to accelerate the crosslinking of the polyester resin. In general, the initiator is employed in an amount within the range of 0.001 to 15% by weight, again based on the total weight of the composition.

The asphalt composition of this invention can be used in a variety of applications in the same manner as conventional polyester molding compositions. The compositions of the invention are particularly well suited for use with reinforcing fillers as described above, and can thus be molded into the desired shape and then cured to form rigid articles.

It has been found, for example, that the bonding relationship between the glass fibers and the polyester-modified asphalt can be facilitated where the glass has been treated with an organo silane anchoring agent of the type conventionally used in the treatment of glass fibers for use in the reinforcement of elastomeric materials. Without limiting the present invention as to theory, it is believed that such organo silanes as well as their corresponding silanols and siloxanes, become chemically bonded to the glass surfaces, thus leaving free for reaction with the polyester resin the functional group attached to the silane. Considering as illustrative, gamma-aminopropyltriethoxysilane, the amine group is thus available for reaction with functional groups within the polyester resin portion of the asphalt to thereby form a chemical bond between the resin-modified asphalt and the glass fibers combined therewith.

Because the asphalt compositions of this invention are rigid materials on curing, the asphalt compositions of this invention can also be used in the manufacture of molded products, and particularly molded products in which glass fibers are employed as reinforcement. Thus, the asphalt composition of this invention forms a continuous phase in which the glass fibers, preferably glass fibers containing a thin film coating of an organo silicon compound as an anchoring agent, are distributed as reinforcement.

As used herein, the term "anchoring agent" refers to a number of organo silicon compounds well known to those skilled in the art which can be used to anchor the chemically-modified asphalt composition to glass, and preferably glass fibers, to promote a secure bonding relationship therebetween. In general, such organo silicon compounds including organo silanes contain 1-3 readily hydrolyzable groups and at least one organic group bonded directly to the silicon atom, with the organic group being substituted by one or more functional groups including an amino group, a mercapto group, a hydroxy group, a glycidoxy group, a carboxy group, an amide group, etc. Also included are organo silanes in which the organic group bonded directly to the silicon atom is unsaturated, such as a vinyl group, allyl group and the like. In addition to the silanes described above, use can also be made of compounds in their hydrolyzed form, that is the corresponding silanols or polysiloxane polymers. Such silanes are described in detail in, for example, U.S. Pat. No. 3,864,203.

In accordance with this concept of the invention, the organo silicon compound, and particularly the functional group contained in it, is capable of establishing a secure chemical bond between the chemically-modified asphalt composition of this invention and glass surfaces. Considering, for example, gamma-aminopropyltriethoxysilane as an example, glass fibers which have been coated, preferably in forming, with a size composition containing gamma-amino-propyltriethoxysilane, contain on the glass fiber surfaces the silane bonded directly to the glass as schematically illustrated below:

Glass surface—Si—CH$_2$—CH$_2$—CH$_2$—NH$_2$

When such glass fibers are used as reinforcement for asphalt compositions of this invention, the free amino group which is chemically bonded directly to the glass fiber surfaces is capable of reaction with, for example, free carboxy groups or anhydride groups contained in the asphalt by reason of the reaction with the acid or anhydride with the asphalt.

Having described the basic concepts of the present invention, reference is now made to the following examples, which are provided by way of illustration and not by way of limitation of the practice of this invention in the preparation and use of asphalt compositions embodying the features of the invention.

EXAMPLE 1

This example illustrates the preparation of a polyester-modified asphalt composition embodying the concepts of this invention and its cure using styrene as a crosslinking agent.

A sample of 400 parts by weight of asphalt is placed into a resin pot and heated to 110° C. as the resin pot is flushed with nitrogen. Then, 300 parts by weight of maleic anhydride are added, and the mixture is stirred under nitrogen gas; the temperature is raised to 200° C. for 3 hours. The temperature is then lowered to 80° C., and 324.64 parts by weight of diethylene glycol are added, as the temperature is slowly raised to 150° C. The mixture is then stirred overnight under a nitrogen blanket.

A 50 g sample of the foregoing asphalt-polyester copolymer is placed into a resin pot and heated to 140° C. Thereafter, 30 g of a maleic anhydride-diethylenic glycol polyester resin dissolved in 10 g of styrene are added, and the resulting mixture is stirred at 140° C. for 96 hours in the presence of 0.5 g of benzoyl peroxide. The resulting polyester-modified asphalt is very hard and brittle.

EXAMPLE 2

Using the procedure of Example 1, a sample of 400 parts by weight of asphalt is reacted with 250 parts by weight of terephthalic anhydride. After about 4 hours of reaction, triethylene glycol is added to the reaction and the temperature slowly raised to facilitate the reaction to form the polyester resin in situ.

The resulting polyester-modified asphalt is then mixed with the polyester resin described in Example 1 dissolved in styrene, and the resulting blend mixed with glass fibers which have been coated in forming with a thin film size coating containing gamma-aminopropyl-triethoxysilane. The molded article is rigid and non-tacky.

It will be understood that various changes and modifications can be made in the details of procedure, formulation and use without departing from the spirit of the invention, especially as defined in the following claims.

We claim:

1. An asphalt-polyester composition comprising the reaction product of (1) a polyester resin prepared by reaction of an unsaturated polycarboxylic acid or anhydride and an organic polyalcohol, (2) a polymerizable vinyl monomer, and (3) a chemically-modified asphalt, said chemically-modified asphalt having been prepared by reaction of an asphalt, a polyester-forming polycarboxylic acid or anhydride and a polyester-forming organic polyalcohol.

2. A composition as defined in claim 1 wherein the acid or anhydride is an organic acid or anhydride containing 2 to 25 carbon atoms and 2 to 4 carboxyl groups.

3. A composition as defined in claim 1 wherein the polyalcohol contains 2 to 20 carbon atoms and 2 to 4 hydroxyl groups.

4. A composition as defined in claim 1 wherein the composition has been cured.

5. A composition as defined in claim 1 wherein the asphalt is first reacted with the acid or anhydride and the resulting product is reacted with the polyalcohol.

6. A composition as defined in claim 1 wherein the acid or anhydride reacted is an amount within the range of 5 to 200% by weight based on the weight of the asphalt.

7. A composition as defined in claim 1 wherein the vinyl monomer is a vinyl aromatic monomer.

8. A composition as defined in claim 1 wherein the polyester-forming polycarboxylic acid or anhydride is an unsaturated acid or anhydride.

9. A composition as defined in claim 1 wherein the polyester-forming carboxylic acid or anhydride and the organic polyalcohol form in situ a polyester resin which is the same as (1).

10. A reinforced composite comprising a chemically-modified asphalt as defined in claim 1 as a continuous phase, and a reinforcing filler distributed throughout the continuous phase as reinforcement therefor.

11. A composite as defined in claim 11 wherein the filler is formed of glass fibers.

12. A composite as defined in claim 11 wherein the glass fibers contained on the surfaces thereof comprise a thin size coating containing an organo silicon compound as an anchoring agent.

13. A composite as defined in claim 16 wherein the chemically-modified asphalt is cured.

14. A method of forming an asphalt-polyester composition comprising: reacting asphalt, a polyester-forming polycarboxylic acid, or anhydride, and a polyester-forming organic polyalcohol to form a modified asphalt; reacting said modified asphalt with an unsaturated polyester resin formed by reaction of an unsaturated polycarboxylic acid or anhydride and an organic polyalcohol and a polymerizable vinyl monomeric crosslinking agent.

15. A composition as defined in claim 1 wherein the polyester resin of (1) is prepared from maleic anhydride.

* * * * *